(12) United States Patent
Yoneyama

(10) Patent No.: US 6,549,343 B2
(45) Date of Patent: Apr. 15, 2003

(54) INTERMEDIATE TELEPHOTO LENS SYSTEM

(75) Inventor: Shuji Yoneyama, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/933,773

(22) Filed: Aug. 22, 2001

(65) Prior Publication Data

US 2002/0048092 A1 Apr. 25, 2002

(30) Foreign Application Priority Data

Aug. 23, 2000 (JP) .................................. 2000-252828

(51) Int. Cl.⁷ .............................................. G02B 13/02
(52) U.S. Cl. .................... 359/745; 359/745; 359/755
(58) Field of Search .............................. 359/676, 745, 359/754, 755

(56) References Cited

U.S. PATENT DOCUMENTS

| | | | | |
|---|---|---|---|---|
| 3,848,968 A | * | 11/1974 | Grey | 359/677 |
| 4,508,434 A | | 4/1985 | Ogawa | 359/745 |
| 5,717,527 A | * | 2/1998 | Shibayama | 359/690 |
| 6,038,082 A | * | 3/2000 | Takatsuki | 359/688 |

FOREIGN PATENT DOCUMENTS

| JP | 62244010 | 10/1987 |
|---|---|---|
| JP | 5188286 | 7/1993 |
| JP | 5224119 | 9/1993 |

OTHER PUBLICATIONS

"Prime Lenses", Tamron lens Catalog, p. 10, along with a full English Translation.

"This Month's Test Room– Three Tamron/Sigma's Interchangeable Lenses", Photographic Industries, Sep. , 1979, pp. 34–36, along with a full English Translation.

* cited by examiner

Primary Examiner—Jordan M. Schwartz
Assistant Examiner—Jessica Stultz
(74) Attorney, Agent, or Firm—Greenblum & Bernstein, P.L.C.

(57) ABSTRACT

An intermediate telephoto lens system includes a first lens group and a second lens group. The first lens group includes a first lens element, a second lens element, a third lens element, an aperture stop, cemented lens elements constituted by a fourth lens element and a fifth lens element, and a sixth lens element. The second lens group includes a seventh lens element and an eighth lens element. Upon focusing, only the first lens group moves along the optical axis. The intermediate telephoto lens system satisfies the following condition: $(v'_{1-1}+v'_{1-2})/2>102 \ldots (1)$; $v'_{1-1}$: the dispersion ratio of the first lens element; $v'_{1-2}$: the dispersion ratio of the second lens element; $v'=(n_d-1)/(n_g-n_F)$; $n_d$: the refractive index of the d-line for each lens element; $n_g$: the refractive index of the g-line for each lens element n the refractive index of the F-line for each lens element.

6 Claims, 15 Drawing Sheets

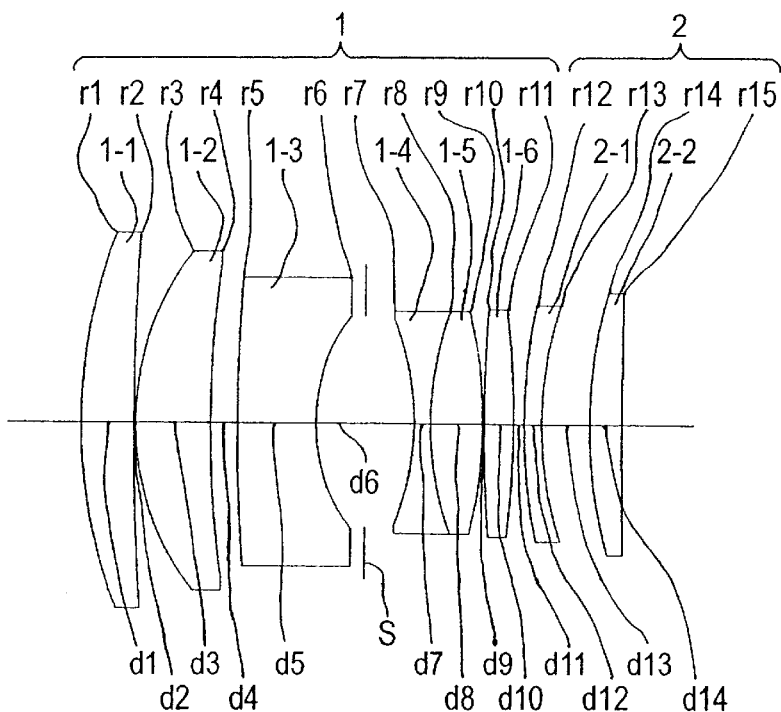
Fig.1
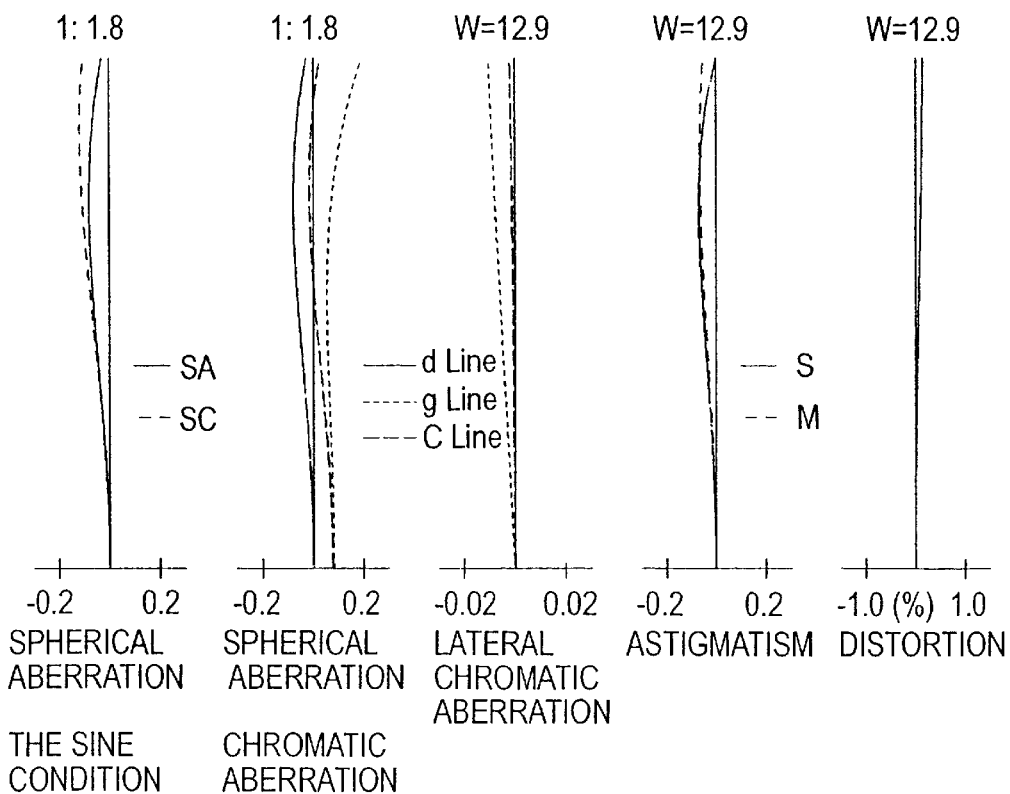

Fig.3
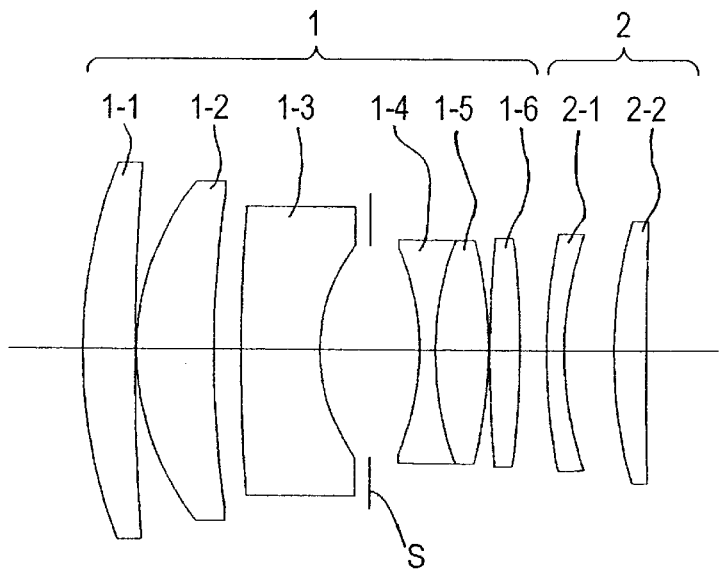
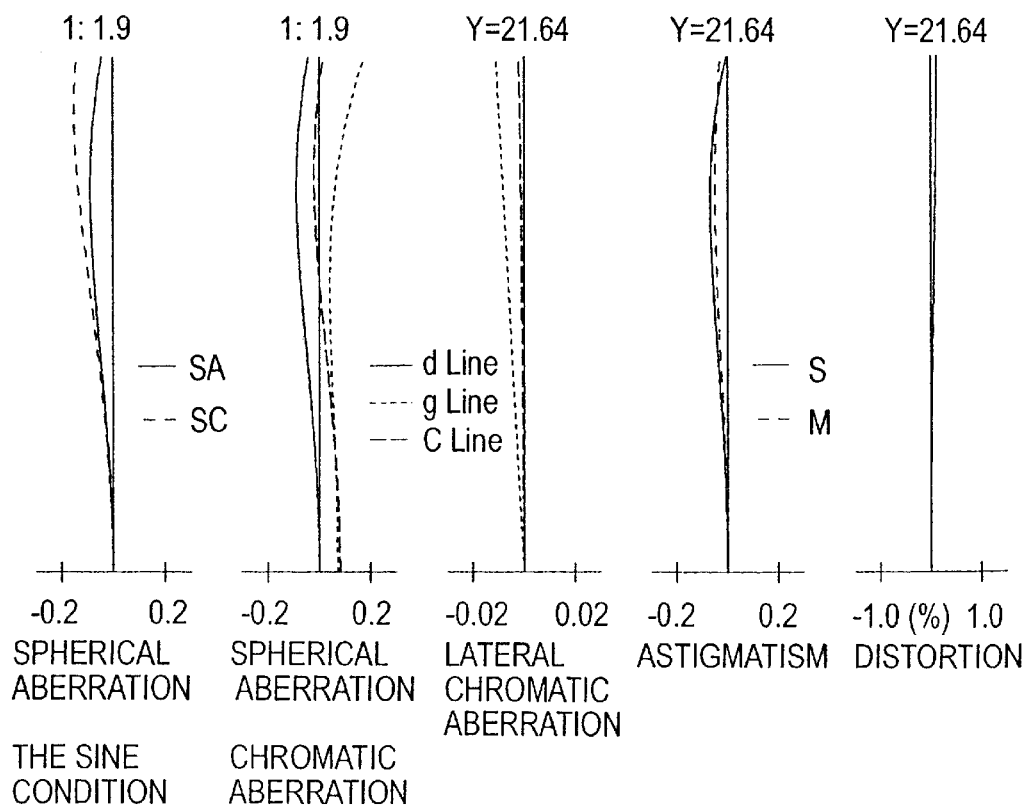
Fig.4A  Fig.4B  Fig.4C  Fig.4D  Fig.4E

Fig.5
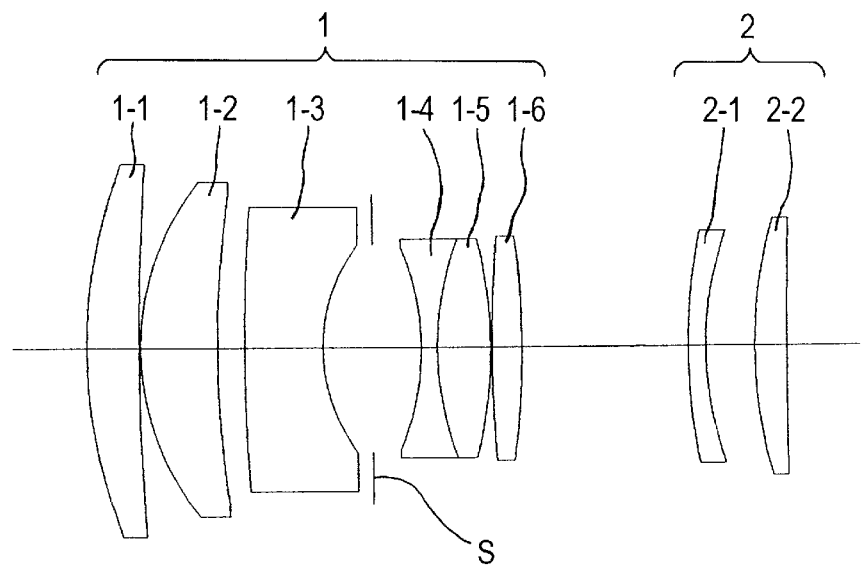
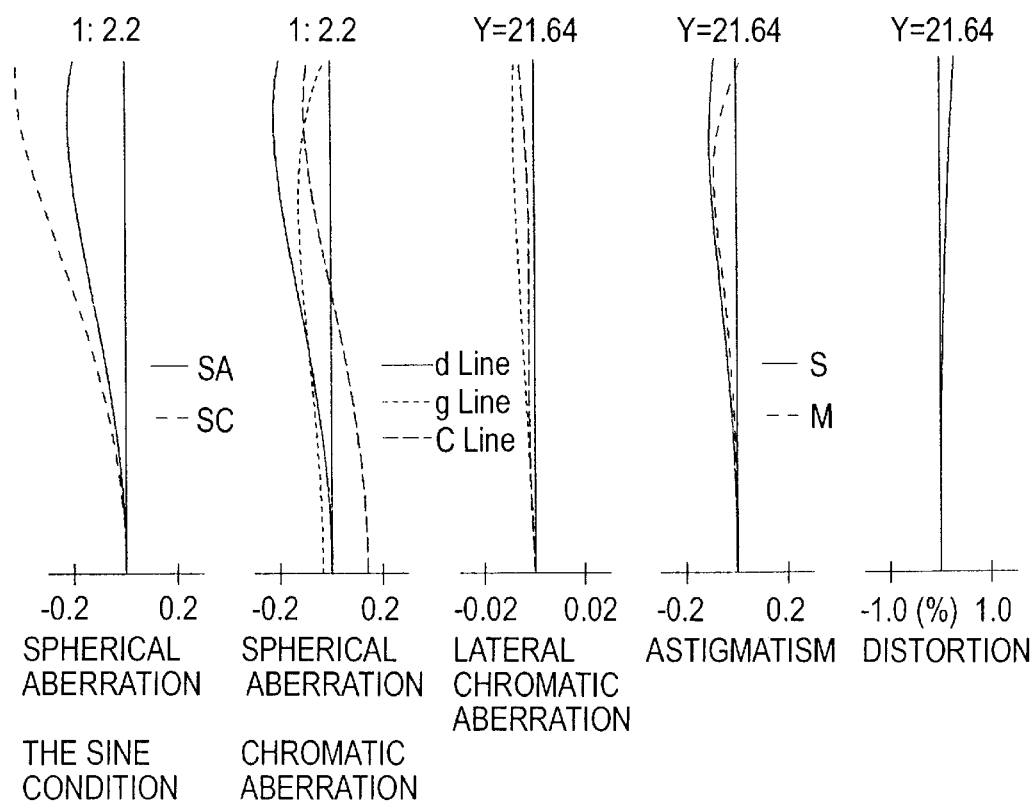
Fig.6A  Fig.6B  Fig.6C  Fig.6D  Fig.6E
SPHERICAL ABERRATION
THE SINE CONDITION
SPHERICAL ABERRATION
CHROMATIC ABERRATION
LATERAL CHROMATIC ABERRATION
ASTIGMATISM
DISTORTION

INTERMEDIATE TELEPHOTO LENS SYSTEM

BACKGROUND OF THE INVENTION

1. Field of the Invention

The present invention relates to an intermediate telephoto lens system with an angle-of-view of about 24° to 27° (corresponding to a focal length of about 90 mm to 100 mm in a photographing lens system for a 35 mm-format camera), which is suitable for a single lens reflex camera, a video camera and the like.

2. Description of the Related Art

An intermediate telephoto lens system with an angle-of-view of about 240 to 270 has been proposed in, for example, U.S. Pat. No. 4,508,434 Japanese Unexamined Patent Publication (J.U.P.P.) No. Sho-62-244010, and J.U.P.P. No. Hei-5-224119; however, the intermediate telephoto lens systems disclosed therein cannot correct astigmatism and chromatic aberration sufficiently. In particular, the intermediate telephoto lens system disclosed in J.U.P.P. No. Hei-5-224119, a floating mechanism is employed for improving the optical performance at close distances; however, the floating mechanism is complicated, which greatly increases the production costs. Despite employing the floating mechanism, the amount of change in aberrations at closer distances becomes noticeable, in particular, fluctuation of astigmatism becomes larger.

SUMMARY OF THE INVENTION

It is an object of the present invention to provide an intermediate telephoto lens system which has at least the following features:

(i) chromatic aberration is made less noticeable;
(ii) astigmatic difference and field curvature are small;
(iii) the amount of change in aberrations occurred at infinity toward a close distance corresponding to a magnification of about −1/5 is small; and
(iv) an angle-of-view is about 24° to 27°.

In order to achieve the above-mentioned object, there is provided an intermediate telephoto lens system including a positive first lens group 1, and a positive second lens group 2, in this order from the object. The first lens group 1 includes a positive 1-1 lens element (a first lens element) having stronger positive power on the object-side surface thereof, a positive 1-2 lens element (a second lens element) constituted by a positive meniscus lens element having positive power on the object-side surface, a negative 1-3 lens element (a third lens element) constituted by a negative meniscus lens element having the concave surface facing toward the image, an aperture stop ('Stop' in Tables), cemented lens elements constituted by a negative 1-4 lens element (a fourth lens element) having a concave surface facing toward the object and a positive 1-5 lens element (a fifth lens element), and a positive 1-6 lens element (a sixth lens element), in this order from the object. The second lens group 2 includes a negative 2-1 lens element (a seventh lens element) constituted by a negative meniscus lens element having the convex surface facing toward the object, and a positive 2-2 lens element (an eighth lens element), in this order from the object. Upon focusing, only the first lens group 1 moves along the optical axis. Furthermore, the intermediate telephoto lens system satisfies the following condition:

$$(\nu'_{1-1}+\nu'_{1-2})/2>102 \tag{1}$$

wherein $\nu'_{1-1}$ designates the dispersion ratio of the positive 1-1 lens element;

$\nu'_{1-2}$ designates the dispersion ratio of the positive 1-2 lens element;

$$(\nu'=(n_d-1)/(n_g-n_F))$$

$n_d$ designates the refractive index of the d-line with respect to each lens element;

$n_g$ designates the refractive index of the g-line with respect to each lens element;

$n_F$ designates the refractive index of the F-line with respect to each lens element.

The intermediate telephoto lens system according to the present invention preferably satisfies the following condition:

$$-1.10<f/f_{2-1}<-0.05 \tag{2}$$

wherein $f_{2-1}$ designates the focal length of the negative 2-1 lens element.

The intermediate telephoto lens system according to the present invention can satisfy the following condition:

$$-0.3<(\phi_4+\phi_5)f<0 \tag{3}$$

wherein $\phi_4$ designates the power of the image-side surface of the positive 1-2 lens element, which is defined as $\phi_4=(1-n_{1-2})/r_4$;

$n_{1-2}$ designates the refractive index of the 1-2 lens element with respect to the d-line, and $r_4$ designates the radius of curvature of the image-side surface of the positive 1-2 lens element; and $\phi_5$ designates the power of the object-side surface of the negative 1-3 lens element, which is defined as $\phi_5=(n_{1-3}-1)/r_5$;

$n_{1-3}$ designates the refractive index of the negative 1-3 lens element with respect to the d-line, and $r_5$ designates the radius of curvature of the object-side surface of the negative 1-3 lens element.

The intermediate telephoto lens system according to the present invention preferably satisfies the following condition:

$$0.2<f/f_{1-6}<0.4 \tag{4}$$

wherein $f_{1-6}$ designates the combined focal length of the positive 1-1 lens element to the negative 1-3 lens element.

The intermediate telephoto lens system according to the present invention can satisfy the following condition:

$$0.15<(r_7-r_9)/f<0.45 \tag{5}$$

wherein $r_7$ designates the radius of curvature of the object-side surface of the negative 1-4 lens element; and $r_9$ designates the radius of curvature of the image-side surface of the a positive 1-5 lens element.

Preferably, the intermediate telephoto lens system according to the present invention satisfies the following condition (6):

$$-20 < \sigma_{2-1} < -1 \qquad (6)$$

wherein $\sigma_{2-1}$ designates the shape factor of the negative 2-1 lens element, which is defined as $\sigma_{2-1}=(r_{13}+r_{12})/(r_{13}-r_{12})$;

$r_{12}$ designates the radius of curvature of the object-side surface of the negative 2-1 lens element, and $r_{13}$ designates the radius of curvature of the image-side surface of the negative 2-1 lens element.

The present disclosure relates to subject matter contained in Japanese Patent Application No. 2000-252828 (filed on Aug. 23, 2000) which is expressly incorporated herein by reference in its entirety.

BRIEF DESCRIPTION OF THE DRAWINGS

The invention will be discussed below in detail with reference to the accompanying drawings, in which:

FIG. 1 shows a lens arrangement of the intermediate telephoto lens system according to a first embodiment of the present invention, when an object at an infinite photographing distance is in an in-focus state;

FIGS. 2A, 2B, 2C, 2D and 2E show aberrations occurred in the lens arrangement shown in FIG. 1;

FIG. 3 shows the lens arrangement of the intermediate telephoto lens system according to the first embodiment, at a photographing magnification of –1/50;

FIGS. 4A, 4B, 4C, 4D and 4E show aberrations occurred in the lens arrangement shown in FIG. 3;

FIG. 5 shows the lens arrangement of the intermediate telephoto lens system according to the first embodiment, at the shortest photographing distance;

FIGS. 6A, 6B, 6C, 6D and 6E show aberrations occurred in the lens arrangement shown in FIG. 5;

DESCRIPTION OF THE PREFERRED EMBODIMENTS

Figure 7:
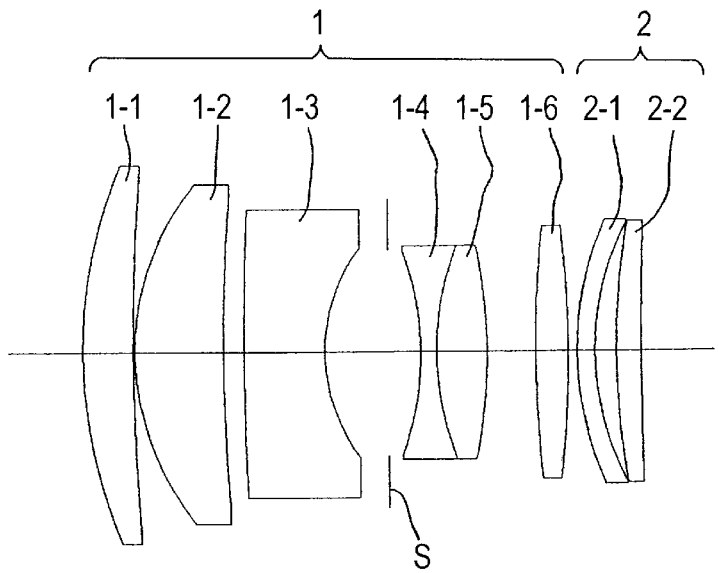
FIG. 7 shows a lens arrangement of the intermediate telephoto lens system according to a second embodiment of the present invention, when an object at an infinite photographing distance is in an in-focus state.
Figures 8A, 8B, 8C, 8D, 8E:
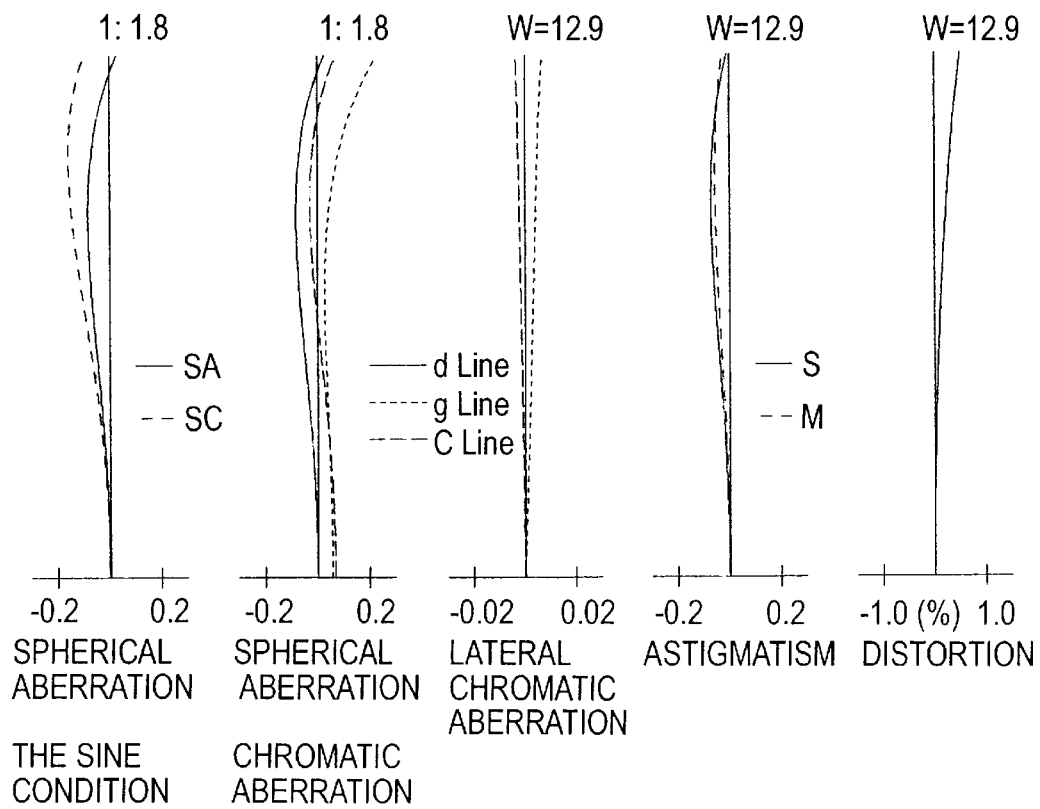
FIGS. 8A, 8B, 8C, 8D and 8E show aberrations occurred in the lens arrangement shown in FIG. 7.

The intermediate telephoto lens system of the present invention, as shown in each embodiment represented by FIGS. 1, 7, 13, 19 and 25, includes a positive first lens group 1, and a positive second lens group 2, in this order from the object. Upon focusing, only the first lens group 1 is moved in the optical axis direction. In order to attain a fast intermediate telephoto lens system which has an angle-of-view of about 25° for the entire lens system, and has an F-number of less than 2.0, the first lens group 1 employs a modified Gauss-type lens system which is suitable for providing a large aperture in the lens system.

On the image side of the modified Gauss-type first lens group 1, the second lens group 2 is positioned. The second lens group 2 is arranged to have weaker positive power than that of the first lens group 1 so that the amount of change in aberrations at closer distances can be reduced. Furthermore, focusing is performed under the condition that the second lens group 2 is made stationary, and only the first lens group 1 is advanced, so that the effect of floating can be obtained without making the mechanism complicated. In particular, the effect of floating can more easily be obtained by (i) providing the second lens group 2 with a slightly reduced magnification, e.g., about 0.89 to 0.97, in order to reduce aberrations occurred in the first lens group 1, and by (ii) varying the distance between the first lens group 1 and the second lens group 2 to change aberrations occurred in the second lens group 2.

In each embodiment, the first lens group 1 includes a positive 1-1 lens element (a first lens element) having positive power on the object-side surface thereof, a positive 1-2 lens element (a second lens element) constituted by a positive meniscus lens element having positive power on the object-side surface, a negative 1-3 lens element (a third lens element) constituted by a negative meniscus lens element having the concave surface facing toward the image, cemented lens elements constituted by a negative 1-4 lens element (a fourth lens element) having a concave surface facing toward the object and a positive 1-5 lens element (a fifth lens element), and a positive 1-6 lens element (a sixth lens element), in this order from the object. In other words, the first lens group 1 is a modified Gauss-type lens system.

In each embodiment, the second lens group 2 includes a negative 2-1 lens element (a seventh lens element) constituted by a negative meniscus lens element having a convex surface facing toward the object, and a positive 2-2 lens element (an eighth lens element), in this order from the object. An aperture stop S is fixed between the negative 1-3 lens element and the negative 1-4 lens element of the first lens group 1. According to the lens arrangement of the second lens group 2 including the negative 2-1 lens element constituted by a negative meniscus lens element having a convex surface facing toward the object and the positive 2-2 lens element, field curvature and astigmatism can, in particular, be reduced, and the amount of distance-dependent changes thereof can also be reduced.

In the case where a lens system having an angle-of-view of about 25° is employed in, e.g., a photographing lens system for a 35 mm-format camera, a focal length corresponding to the above angle-of-view of 25° is about 100 mm. However, chromatic aberration which occurs along with an increase of the focal length becomes noticeable to the extent that the chromatic aberration cannot be negligible.

Condition (1) is for reducing chromatic aberration. In other words, v' designates the dispersion ratio of the spectrum of the F-line to that of the g-line. If the value of v' is set larger, the secondary spectrum which remains after an achromatic operation (i.e., chromatic aberration is corrected) by the C–F lines can be made smaller.

If $(v'_{1-1}+v'_{1-2})/2$ exceeds the lower limit of condition (1), the correcting of chromatic aberration of the C over g-lines cannot be made sufficiently.

Condition (2) specifies the power of the negative lens element (i.e., the 2-1 (seventh) lens element) in the second lens group 2. By satisfying this condition, the Petzval sum can be reduced. This means that the negative lens element can function as a filed flattener. Furthermore, by satisfying this condition, astigmatism can be made smaller.

If the negative power of the negative lens element becomes stronger to the extent that $f/f_{2-1}$ exceeds the lower limit of condition (2), the Petzval sum becomes too small, so that field curvature is overcorrected.

If that $f/f_{2-1}$ exceeds the upper limit of condition (2), the negative power becomes weaker, so that the Petzval sum cannot be made smaller, and the effect on the correcting of astigmatism is diminished.

Condition (3) specifies the power of the air lens formed between the positive 1-2 lens element (the second lens element) and the negative 1-3 lens element (the third lens element) in the first lens group 1. By satisfying this condition, spherical aberration occurred in the first lens group 1 can be made smaller, and balance between coma and astigmatism can be maintained.

If $(\phi_4+\phi_5)$ f exceeds the upper limit of condition (3), the power of the air lens becomes positive, and spherical aberration is occurred in the negative direction, so that the effect on the correcting of spherical aberration cannot be obtained.

If $(\phi_4+\phi_5)$ f exceeds the lower limit of condition (3), spherical aberration is largely occurred in the negative direction, and coma and astigmatism occur. Coma and astigmatism occurred on each of the object-side and image-side surfaces of the air lens are balanced by canceling each other out, and maintain predetermined numerical values; however, if $(\phi_4+\phi_5)$ f exceeds the lower limit of condition (3), the balance is lost, so that the difference of coma and astigmatism on the both surfaces of the air lens becomes larger. Accordingly, coma and astigmatism become noticeable.

Condition (4) specifies the combined power of the positive 1-1 lens element (the first lens element), the positive 1-2 lens element (the second lens element) and the negative 1-3 lens element (the third lens element).

If the combined power becomes strong to the extent that $f/f_{1-6}$ exceeds the upper limit of condition (4), the power of each surface of the 1-1 (first) to 1-3 (third) lens elements becomes stronger, so that spherical aberration and coma become larger. As a result, too much load for correcting aberrations is imposed on the 1-4 (fourth) to 1-6 (sixth) lens elements.

If the combined power becomes weaker to the extent that $f/f_{1-6}$ exceeds the lower limit of condition (4), the power of each surface becomes weaker, which is advantageous to correct aberrations; however, the overall length of the lens system becomes longer.

Condition (5) specifies the most object-side and the most image-side radius of curvatures of the cemented lens elements, i.e., the negative 1-4 (fourth) lens element and the positive 1-5 (fifth lens element), and relates to the correcting of spherical aberration. The object-side concave surface of the cemented lens elements is arranged to correct positive spherical aberration largely occurred in the positive 1-1 (first) to the negative 1-3 (third) lens elements, each element of which is determined by conditions (1) and (4) respectively, to negative spherical aberration. On the contrary, the image-side convex surface of the cemented lens elements is arranged to correct negative spherical aberration to positive spherical aberration. Namely, spherical aberration in the positive direction is corrected in the negative direction, and then, corrected in the positive direction. If this balance is lost, spherical aberration occurs (becomes noticeable).

If $(r_7-r_9)/f$ exceeds the upper limit of condition (5), the image-side radius of curvature of the cemented lens elements becomes larger, and the object-side thereof becomes smaller, so that spherical aberration is overcorrected.

If $(r_7-r_9)/f$ exceeds the lower limit of condition (5), spherical aberration is undercorrected.

Condition (6) specifies the shape of the negative lens element (the 2-1 (seventh) lens element) in the second lens group 2. The upper limit of condition (6) specifies that the negative lens element is a negative meniscus lens element having a convex surface facing toward the object.

If $\sigma_{2-1}$ exceeds the upper limit of condition (6), the shape of the negative lens element is changed to a plano-concave lens element, a biconcave lens element, and further to a meniscus lens element having the concave surface facing toward the object. Accordingly, if the negative lens element (the 2-1 (seventh) lens element), which is positioned in a bundle of light rays collected by the first lens group 1, is a meniscus lens element having the concave surface facing toward the object, the object-side concave surface functions as a diverging surface with respect to on-axis light rays, and positive spherical aberration occurs thereon. As a result, spherical aberration is overcorrected. Furthermore, the height of a light ray being incidence on the object-side concave surface varies according to the position of an object, in particular, at a closer distance, so that the amount of spherical aberration varies, which causes a distance-dependent change in spherical aberration. On the other hand, with respect to off-axis light rays, the negative lens element (the 2-1 (seventh) lens element) substantially functions as a concentric lens element, so that the effect on the correcting of astigmatism is diminished.

If $\sigma_{2\text{-}1}$ exceeds the lower limit of condition (6), negative spherical aberration occurs on the object-side surface of the negative lens element (the 2-1 (seventh) lens element), so that negative spherical aberration largely occurs in the entire lens system. Similar to the case where $\sigma_{2\text{-}1}$ exceeds the upper limit of condition (6), a distance-dependent change in spherical aberration occurs. Furthermore, an incident angle of an off-axis light ray which strikes the object-side surface of the negative lens element (the 2-1 (seventh) lens element) becomes too large, so that astigmatism and coma occur.

Specific numerical data of the embodiments will be described hereinafter. In figures showing aberrations, SA designates spherical aberration, and SC designates the sine condition; with respect to chromatic aberration represented by spherical aberration, the solid line and the two types of dotted lines respectively indicate spherical aberrations with respect to the d, g and C lines; with respect to lateral chromatic aberration, the two types of dotted lines respectively indicate magnification with respect to the g and C lines; however, the d line as the base line coincides with the ordinate; S designates the sagittal image, and M designates the meridional image; and Y designates the image height. In the tables, Fno designates the F-number, m designates the photographing magnification, f designates the focal length of the entire zoom lens system, W designates the half angle-of-view (°), $f_B$ designates the back focal distance, r designates the radius of curvature, d designates the lens-element thickness or distance between lens elements, $n_d$ designates the refractive index of the d-line, $n_g$ designates the refractive index of the g-line, $n_F$ designates the refractive index of the F-line, and $\nu$ designates the Abbe number.

[Embodiment 1]

FIG. 1 shows a lens arrangement of the intermediate telephoto lens system, when an object at an infinite photographing distance is in an in-focus state. FIG. 3 shows the lens arrangement of the intermediate telephoto lens, at a photographing magnification of −1/50. FIG. 5 shows the lens arrangement of the intermediate telephoto lens system, at the shortest photographing distance. FIGS. 2A through 2D show aberrations occurred in the lens arrangement shown in FIG. 1. FIGS. 4A through 4D show aberrations occurred in the lens arrangement shown in FIG. 3. FIGS. 6A through 6D show aberrations occurred in the lens arrangement shown in FIG. 5. Table 1 shows the numerical data of the first embodiment.

TABLE 1

|  | Infinity | −1/50 | Shortest-Photo-Distance |
|---|---|---|---|
| f = | 94.00 | | |
| $f_B$ = | 39.92 | 39.92 | 39.92 |
| m = | 0.000 | −0.020 | −0.195 |
| $F_{NO}$ = | 1:1.8 | | |
| W = | 12.9 | | |

TABLE 1-continued

| Surf. | r | d | $n_d$ | $\nu$ | $n_g$ | $n_F$ |
|---|---|---|---|---|---|---|
| 1 | 69.890 | 7.17 | 1.83481 | 42.7 | 1.85953 | 1.84852 |
| 2 | 359.652 | 0.20 | — | — | — | — |
| 3 | 36.877 | 10.52 | 1.49700 | 81.6 | 1.50450 | 1.50123 |
| 4 | 146.632 | 3.69 | — | — | — | — |
| 5 | 252.800 | 10.84 | 1.74077 | 27.8 | — | — |
| 6 | 23.619 | 6.91 | — | — | — | — |
| Stop | ∞ | 6.81 | — | — | — | — |
| 7 | −35.097 | 2.20 | 1.62588 | 35.7 | — | — |
| 8 | 41.875 | 7.31 | 1.80400 | 46.6 | — | — |
| 9 | −60.665 | 0.20 | — | — | — | — |
| 10 | 191.993 | 4.12 | 1.80518 | 25.4 | — | — |
| 11 | −117.826 | 1.51 −3.70 −22.91 | — | — | — | — |
| 12 | 79.480 | 2.40 | 1.71736 | 29.5 | — | — |
| 13 | 47.981 | 6.74 | — | — | — | — |
| 14 | 63.584 | 4.45 | 1.53172 | 48.9 | — | — |
| 15 | 982.252 | — | — | — | — | — |

[Embodiment 2]

Figure 9:
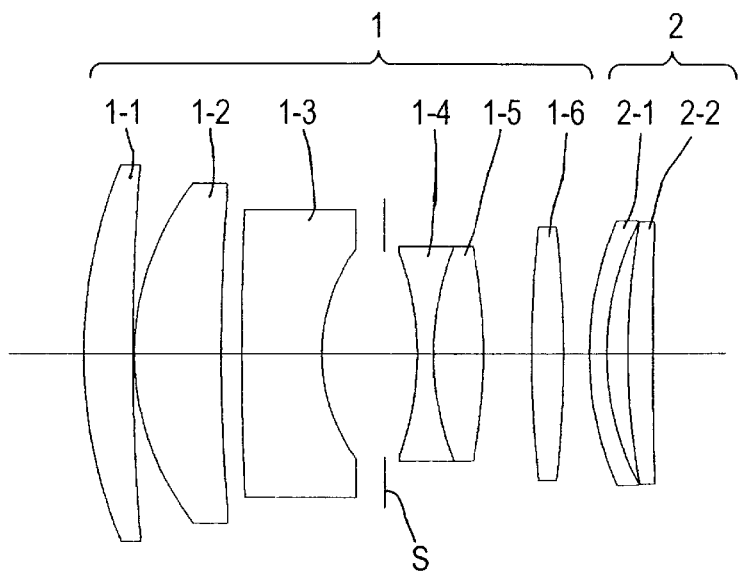
FIG. 9 shows the lens arrangement of the intermediate telephoto lens system according to the second embodiment, at a photographing magnification of –1/50.
Figures 10A, 10B, 10C, 10D, 10E:
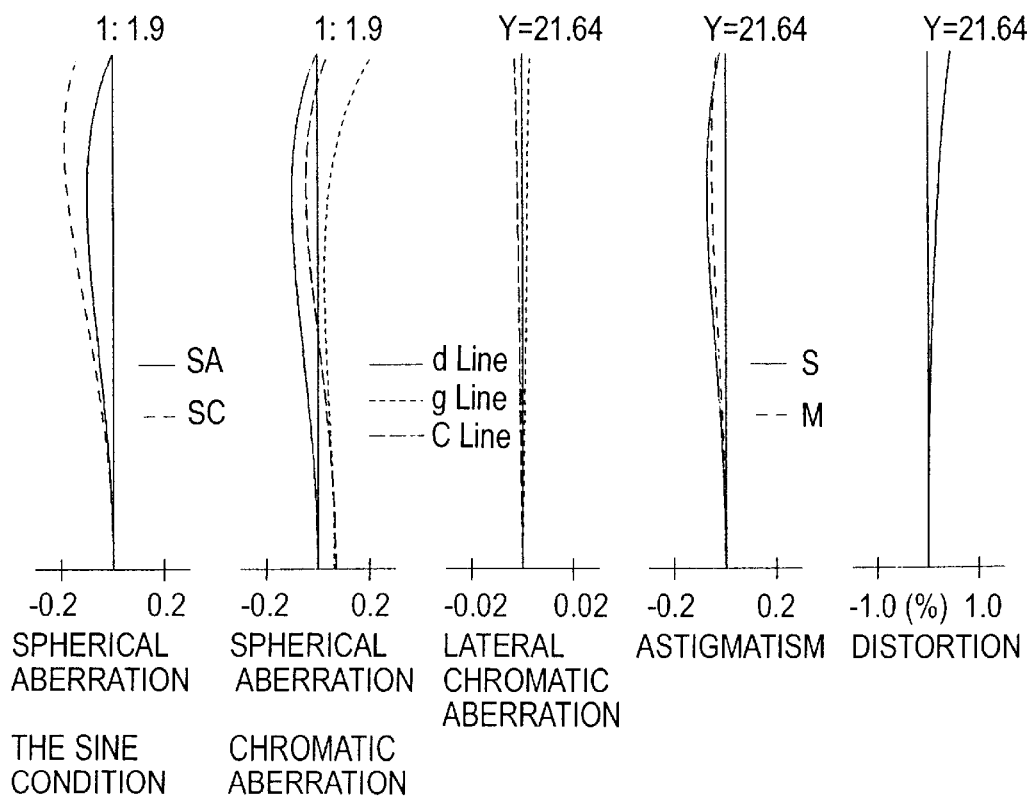
FIGS. 10A, 10B, 10C, 10D and 10E show aberrations occurred in the lens arrangement shown in FIG. 9.
Figure 11:
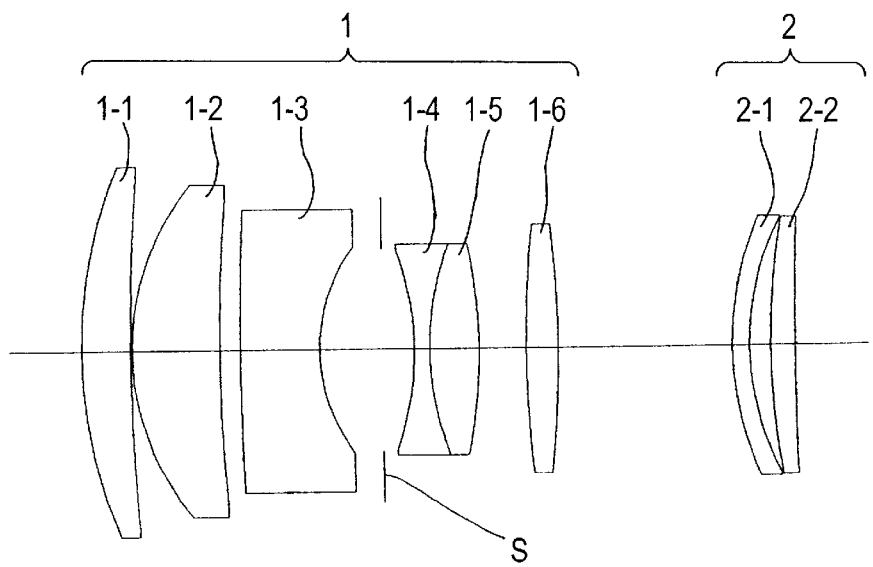
FIG. 11 shows the lens arrangement of the intermediate telephoto lens system according to the second embodiment, at the shortest photographing distance.
Figures 12A, 12B, 12C, 12D, 12E:
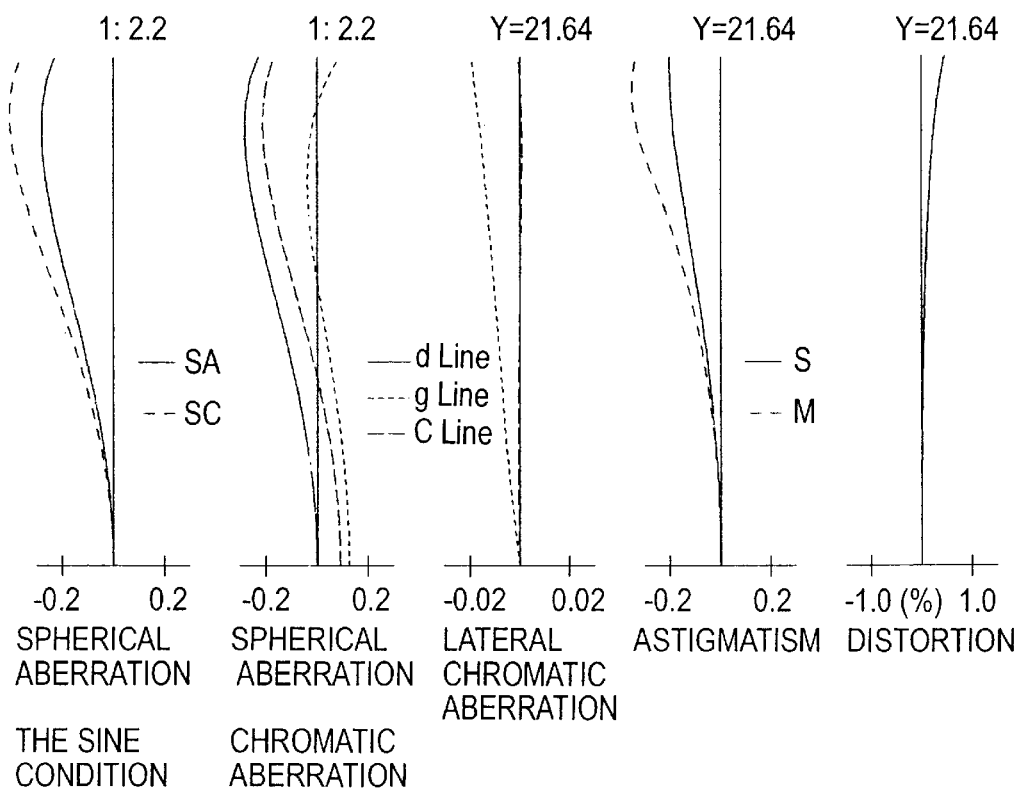
FIGS. 12A, 12B, 12C, 12D and 12E show aberrations occurred in the lens arrangement shown in FIG. 11.

FIG. 7 shows a lens arrangement of the intermediate telephoto lens system, when an object at an infinite photographing distance is in an in-focus state. FIG. 9 shows the lens arrangement of the intermediate telephoto lens system, at a photographing magnification of −1/50. FIG. 11 shows the lens arrangement of the intermediate telephoto lens system, at the shortest photographing distance. FIGS. 8A through 8D show aberrations occurred in the lens arrangement shown in FIG. 7. FIGS. 10A through 10D show aberrations occurred in the lens arrangement shown in FIG. 9. FIGS. 12A through 12D show aberrations occurred in the lens arrangement shown in FIG. 11. Table 2 shows the numerical data of the second embodiment. The basic lens arrangement of the second embodiment is the same as the first embodiment.

TABLE 2

|  | Infinity | −1/50 | Shortest-Photo-Distance |
|---|---|---|---|
| f = | 94.00 | | |
| $f_B$ = | 39.00 | 39.00 | 39.00 |
| m = | 0.000 | −0.020 | −0.195 |
| $F_{NO}$ = | 1:1.8 | | |
| W = | 12.9 | | |

| Surf. | r | d | $n_d$ | $\nu$ | $n_g$ | $n_F$ |
|---|---|---|---|---|---|---|
| 1 | 65.347 | 6.76 | 1.83481 | 42.7 | 1.85953 | 1.84852 |
| 2 | 301.499 | 0.20 | — | — | — | — |
| 3 | 36.828 | 11.91 | 1.43875 | 95.0 | 1.44443 | 1.44195 |
| 4 | 255.834 | 2.83 | — | — | — | — |
| 5 | 437.454 | 11.00 | 1.71736 | 29.5 | — | — |
| 6 | 23.753 | 8.71 | — | — | — | — |
| Stop | ∞ | 4.46 | — | — | — | — |
| 7 | −39.942 | 2.20 | 1.61293 | 37.0 | — | — |
| 8 | 39.942 | 6.87 | 1.78590 | 44.2 | — | — |
| 9 | −73.084 | 6.62 | — | — | — | — |
| 10 | 150.411 | 4.46 | 1.83400 | 37.2 | — | — |
| 11 | −150.411 | 1.20 −3.56 −24.25 | — | — | — | — |
| 12 | 43.746 | 2.40 | 1.62004 | 36.3 | — | — |
| 13 | 37.508 | 2.96 | — | — | — | — |
| 14 | 99.977 | 3.41 | 1.51633 | 64.1 | — | — |
| 15 | 577.098 | — | — | — | — | — |

[Embodiment 3]

Figure 13:
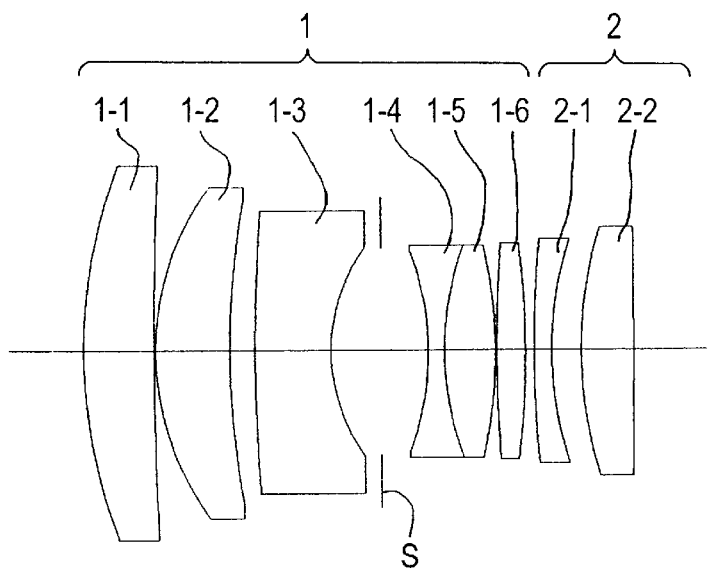
FIG. 13 shows a lens arrangement of the intermediate telephoto lens system according to a third embodiment of the present invention, when an object at an infinite photographing distance is in an in-focus state.
Figures 14A, 14B, 14C, 14D, 14E:
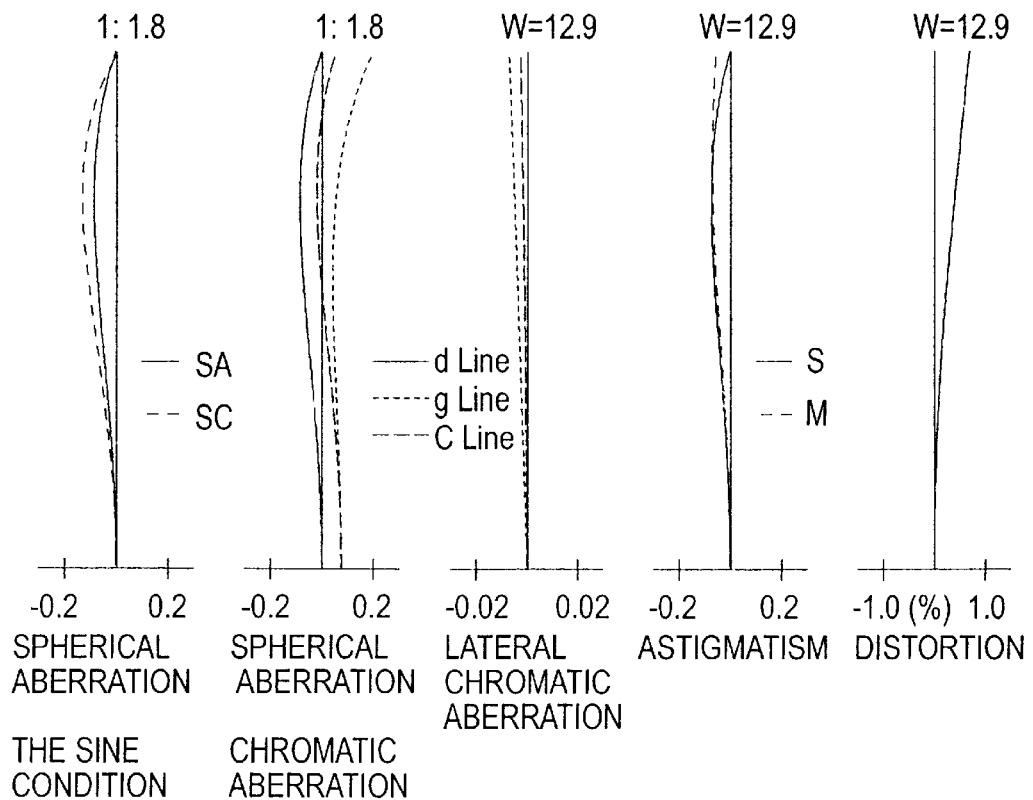
FIGS. 14A, 14B, 14C, 14D and 14E show aberrations occurred in the lens arrangement shown in FIG. 13.
Figure 15:
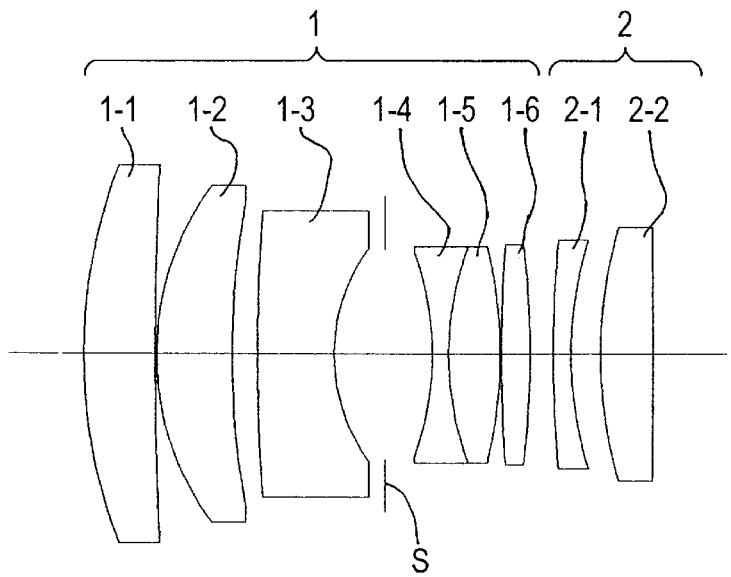
FIG. 15 shows the lens arrangement of the intermediate telephoto lens system according to the third embodiment, at a photographing magnification of –1/50.
Figures 16A, 16B, 16C, 16D, 16E:
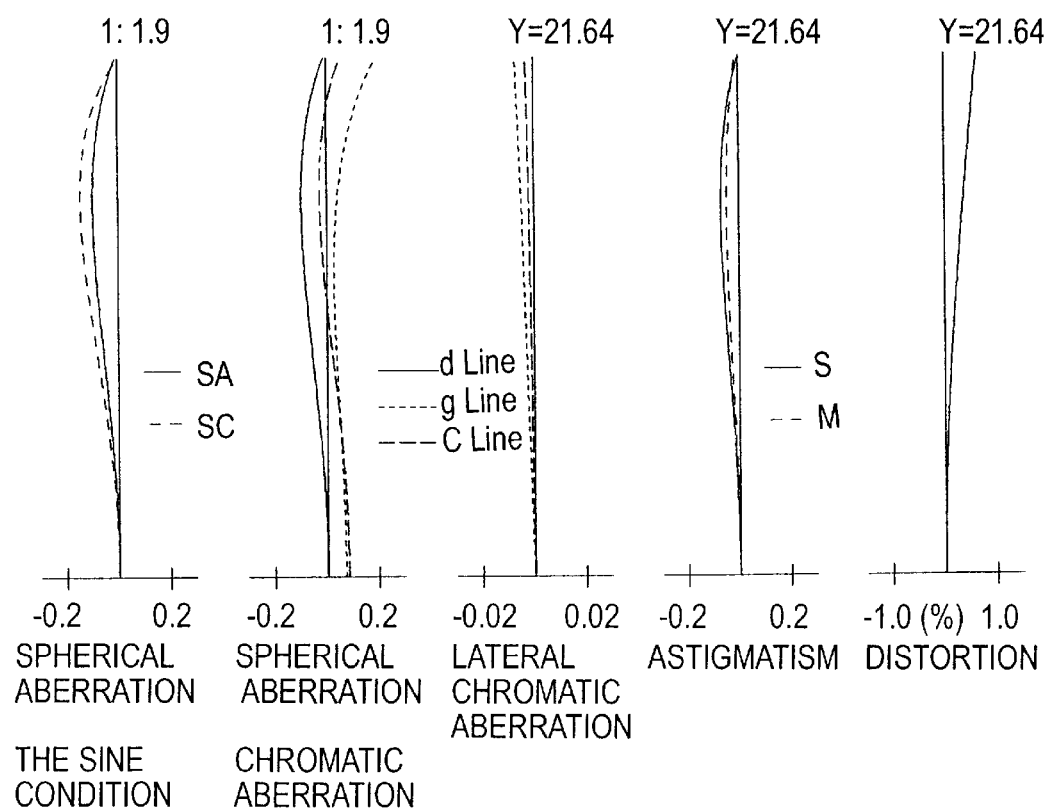
FIGS. 16A, 16B, 16C, 16D and 16E show aberrations occurred in the lens arrangement shown in FIG. 15.
Figure 17:
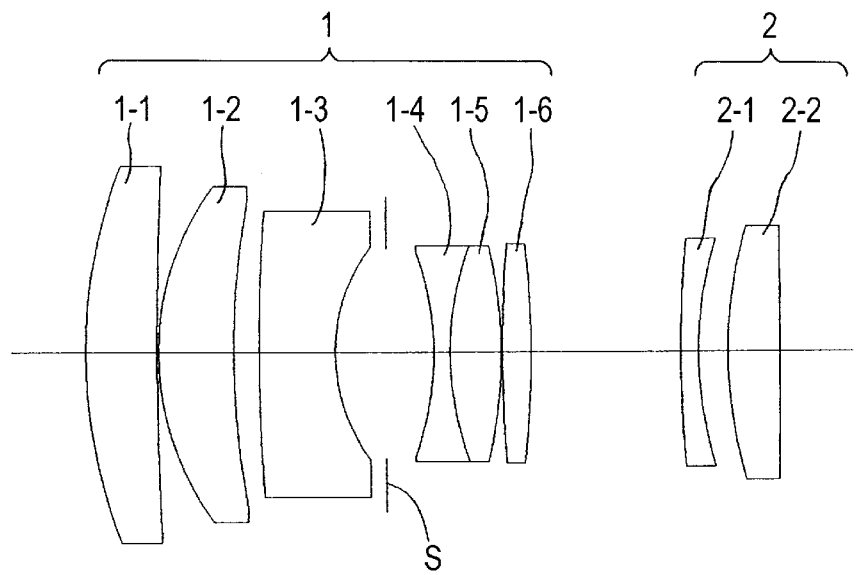
FIG. 17 shows the lens arrangement of the intermediate telephoto lens system according to the third embodiment, at the shortest photographing distance.
Figures 18A, 18B, 18C, 18D, 18E:
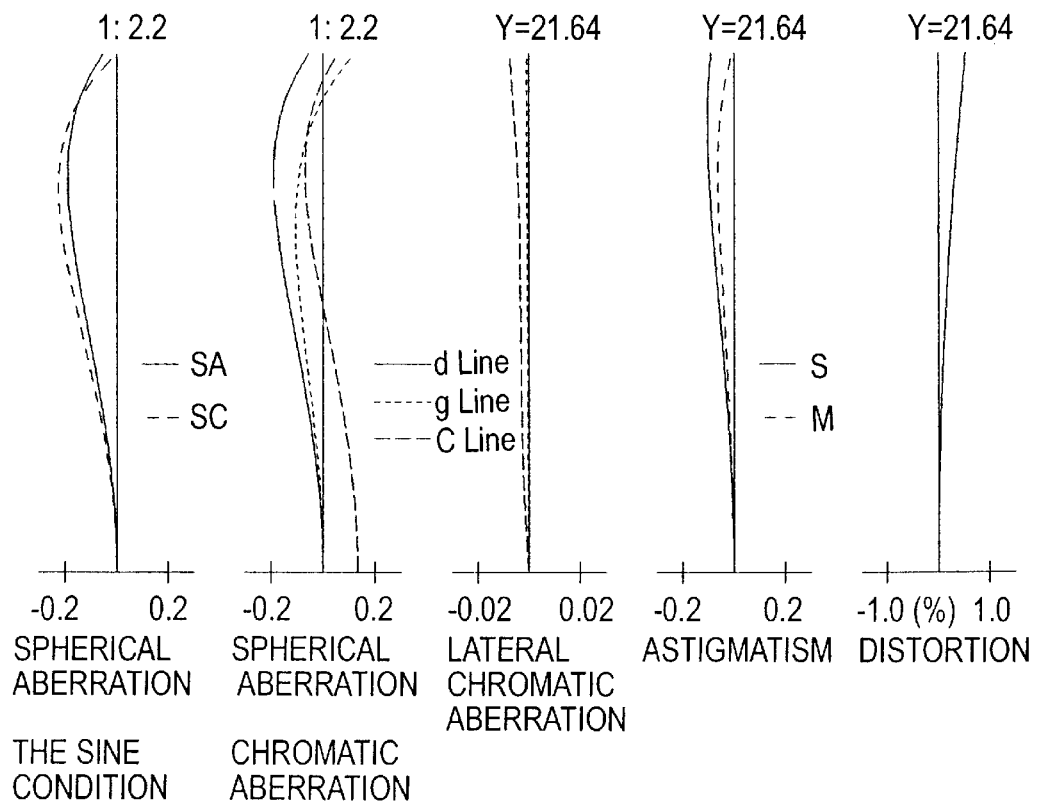
FIGS. 18A, 18B, 18C, 18D and 18E show aberrations occurred in the lens arrangement shown in FIG. 17.

FIG. 13 shows a lens arrangement of the intermediate telephoto lens system, when an object at an infinite photographing distance is in an in-focus state. FIG. 15 shows the lens arrangement of the intermediate telephoto lens system, at a photographing magnification of −1/50. FIG. 17 shows the lens arrangement of the intermediate telephoto lens system, at the shortest photographing distance. FIGS. 14A through 14D show aberrations occurred in the lens arrangement shown in FIG. 13. FIGS. 16A through 16D show aberrations occurred in the lens arrangement shown in FIG. 15. FIGS. 18A through 18D show aberrations occurred in the lens arrangement shown in FIG. 17. Table 3 shows the numerical data of the third embodiment. The basic lens arrangement n of the third embodiment is the same as the first embodiment.

TABLE 3

|  | Infinity | −1/50 | Shortest-Photo-Distance |
|---|---|---|---|
| f = | 94.00 | | |
| $f_B$ = | 39.55 | 39.55 | 39.55 |
| m = | 0.000 | −0.020 | −0.193 |
| $F_{NO}$ = | 1:1.8 | | |
| W = | 12.9 | | |

| Surf. | r | d | $n_d$ | ν | $n_g$ | $n_F$ |
|---|---|---|---|---|---|---|
| 1 | 70.363 | 9.63 | 1.80400 | 46.6 | 1.82569 | 1.81608 |
| 2 | 519.203 | 0.20 | — | — | — | — |
| 3 | 38.341 | 10.15 | 1.56907 | 71.3 | 1.57899 | 1.57464 |
| 4 | 114.782 | 3.46 | — | — | — | — |
| 5 | 255.536 | 10.45 | 1.74077 | 27.8 | — | — |
| 6 | 24.117 | 6.94 | — | — | — | — |
| Stop | ∞ | 6.46 | — | — | — | — |
| 7 | −39.950 | 2.20 | 1.62588 | 35.7 | — | — |
| 8 | 40.808 | 7.05 | 1.80440 | 39.6 | — | — |
| 9 | −63.414 | 0.20 | — | — | — | — |
| 10 | 199.812 | 3.93 | 1.74950 | 35.3 | — | — |
| 11 | −121.757 | 1.21 −3.20 −20.47 | — | — | — | — |
| 12 | 163.412 | 2.40 | 1.71736 | 29.5 | — | — |
| 13 | 50.058 | 4.05 | — | — | — | — |
| 14 | 58.774 | 7.14 | 1.62004 | 36.3 | — | — |
| 15 | −1556.108 | — | — | — | — | — |

[Embodiment 4]

Figure 19:
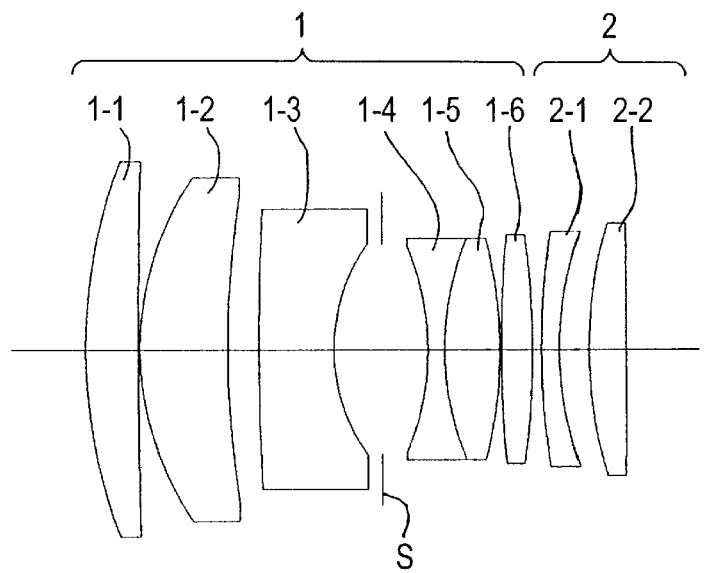
FIG. 19 shows a lens arrangement of the intermediate telephoto lens system according to a fourth embodiment of the present invention, when an object at an infinite photographing distance is in an in-focus state.
Figures 20A, 20B, 20C, 20D, 20E:
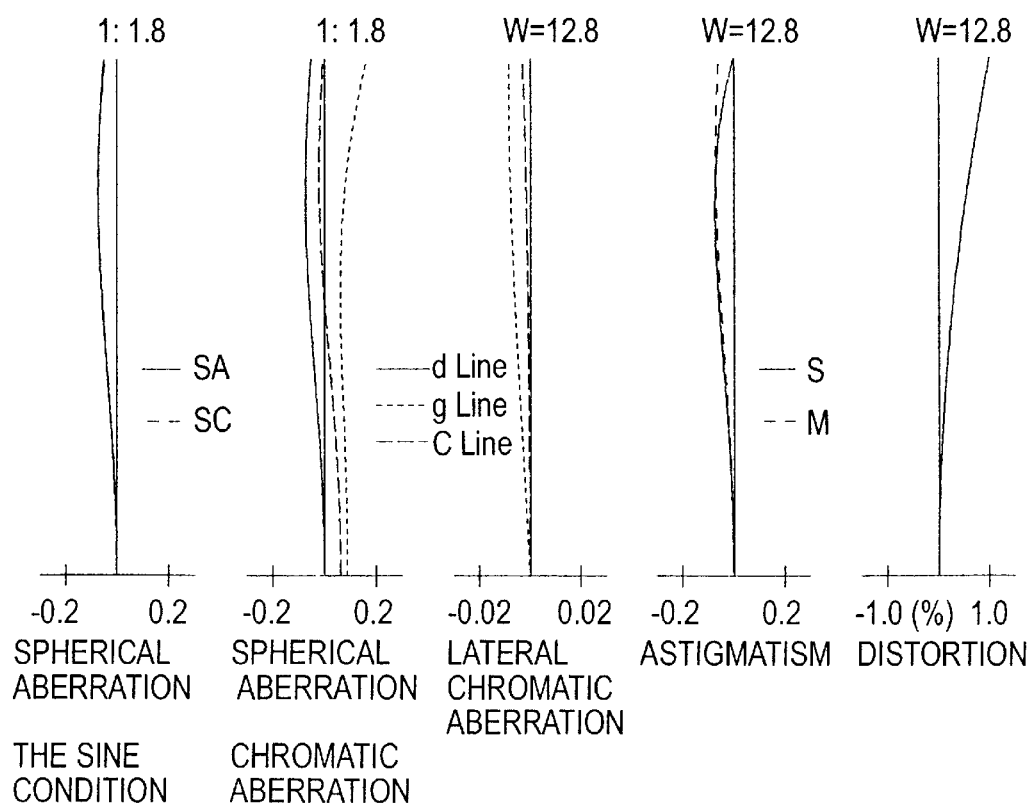
FIGS. 20A, 20B, 20C, 20D and 20E show aberrations occurred in the lens arrangement shown in FIG. 19.
Figure 21:
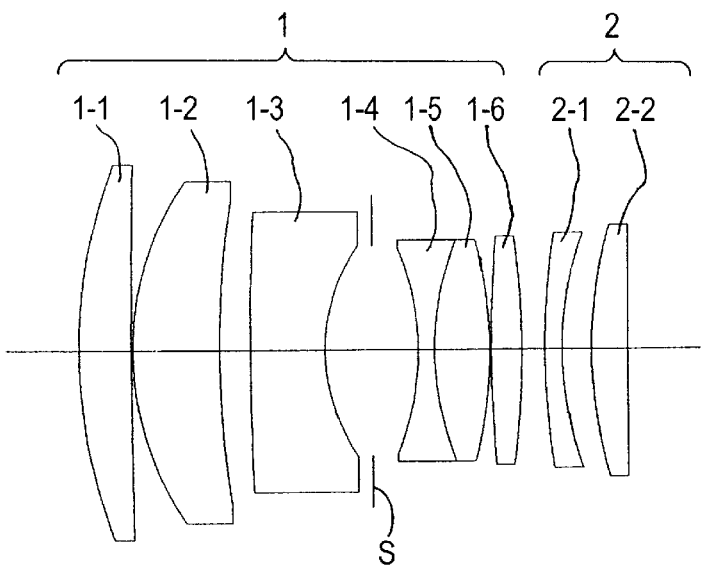
FIG. 21 shows the lens arrangement of the intermediate telephoto lens system according to the fourth embodiment, at a photographing magnification of –1/50.
Figures 22A, 22B, 22C, 22D, 22E:
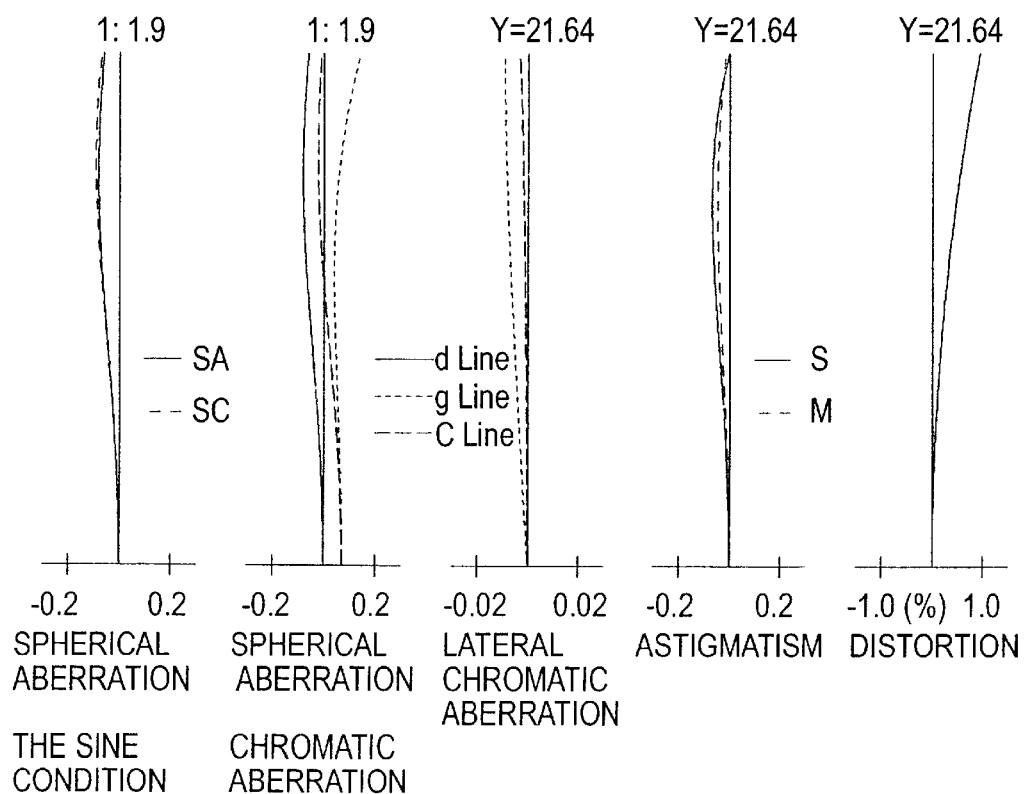
FIGS. 22A, 22B, 22C, 22D and 22E show aberrations occurred in the lens arrangement shown in FIG. 21.
Figure 23:
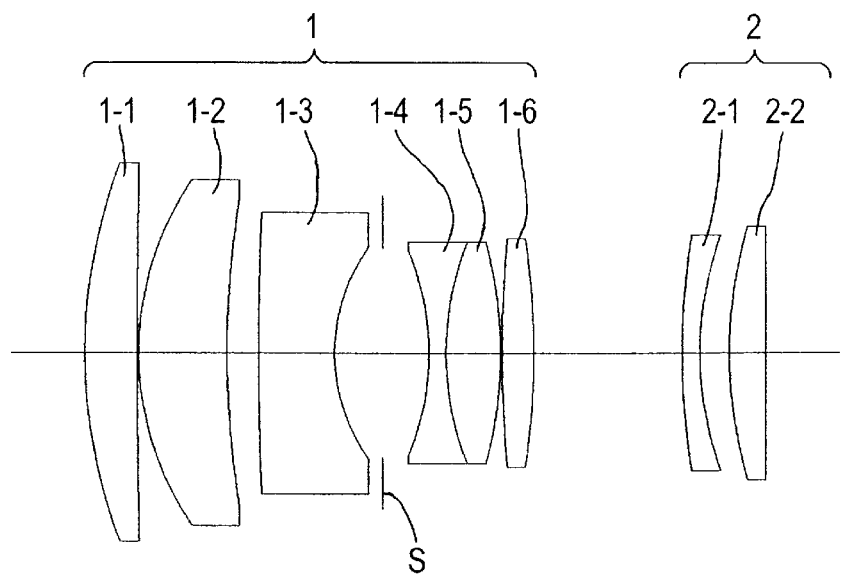
FIG. 23 shows the lens arrangement of the intermediate telephoto lens system according to the fourth embodiment, at the shortest photographing distance.
Figures 24A, 24B, 24C, 24D, 24E:
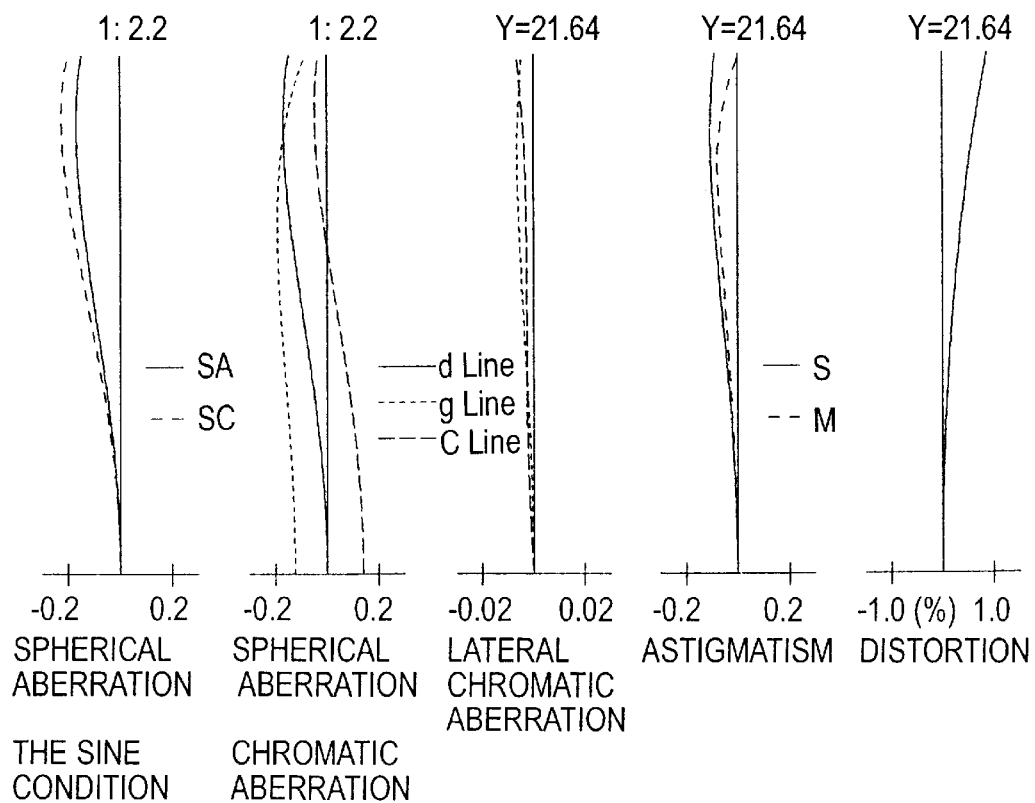
FIGS. 24A, 24B, 24C, 24D and 24E show aberrations occurred in the lens arrangement shown in FIG. 23.

FIG. 19 shows a lens arrangement of the intermediate telephoto lens system, when an object at an infinite photographing distance is in an in-focus state. FIG. 21 shows the lens arrangement of the intermediate telephoto lens system, at a photographing magnification of −1/50. FIG. 23 shows the lens arrangement of the intermediate telephoto lens system, at the shortest photographing distance. FIGS. 20A through 20D show aberrations occurred in the lens arrangement shown in FIG. 19. FIGS. 22A through 22D show aberrations occurred in the lens arrangement shown in FIG. 21. FIGS. 24A through 24D show aberrations occurred in the lens arrangement shown in FIG. 23. Table 4 shows the numerical data of the fourth embodiment. The basic lens arrangement of the fourth embodiment is the same as the first embodiment.

TABLE 4

|  | Infinity | −1/50 | Shortest-Photo-Distance |
|---|---|---|---|
| f = | 94.00 | | |
| $f_B$ = | 41.13 | 41.13 | 41.13 |
| m = | 0.000 | −0.020 | −0.191 |
| $F_{NO}$ = | 1:1.8 | | |
| W = | 12.8 | | |

| Surf. | r | d | $n_d$ | ν | $n_g$ | $n_F$ |
|---|---|---|---|---|---|---|
| 1 | 70.709 | 7.09 | 1.69680 | 55.5 | 1.71234 | 1.70552 |
| 2 | 1072.545 | 0.20 | — | — | — | — |
| 3 | 41.111 | 11.93 | 1.59240 | 68.3 | 1.60318 | 1.59845 |
| 4 | 130.062 | 4.29 | — | — | — | — |
| 5 | 407.601 | 10.37 | 1.71736 | 29.5 | — | — |
| 6 | 24.287 | 6.64 | — | — | — | — |
| Stop | ∞ | 6.31 | — | — | — | — |
| 7 | −35.407 | 2.32 | 1.58144 | 40.7 | — | — |
| 8 | 38.907 | 7.59 | 1.72916 | 54.7 | — | — |
| 9 | −57.457 | 0.20 | — | — | — | — |
| 10 | 172.273 | 4.28 | 1.78470 | 26.3 | — | — |
| 11 | −109.229 | 1.20 −3.20 −20.29 | — | — | — | — |
| 12 | 99.307 | 2.40 | 1.61293 | 37.0 | — | — |
| 13 | 45.275 | 4.07 | — | — | — | — |
| 14 | 59.745 | 4.99 | 1.48749 | 70.2 | — | — |
| 15 | −7020.083 | — | — | — | — | — |

[Embodiment 5]

Figure 25:
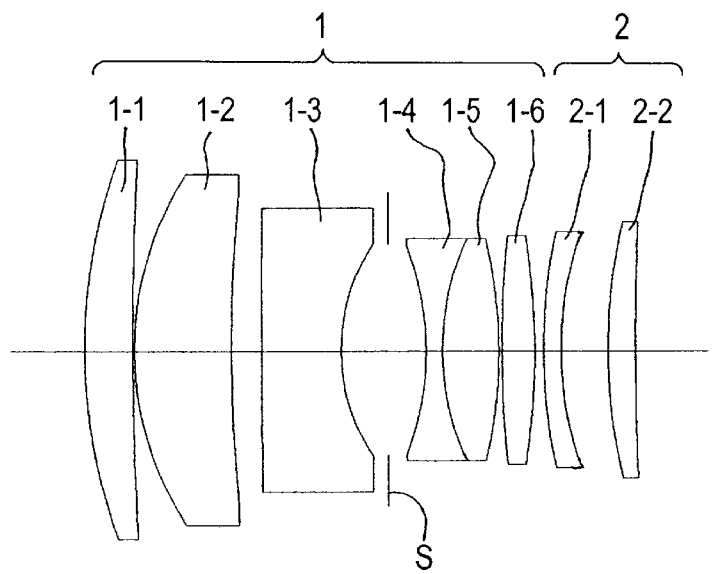
FIG. 25 shows a lens arrangement of the intermediate telephoto lens system according to a fifth embodiment of the present invention, when an object at an infinite photographing distance is in an in-focus state.
Figures 26A, 26B, 26C, 26D, 26E:
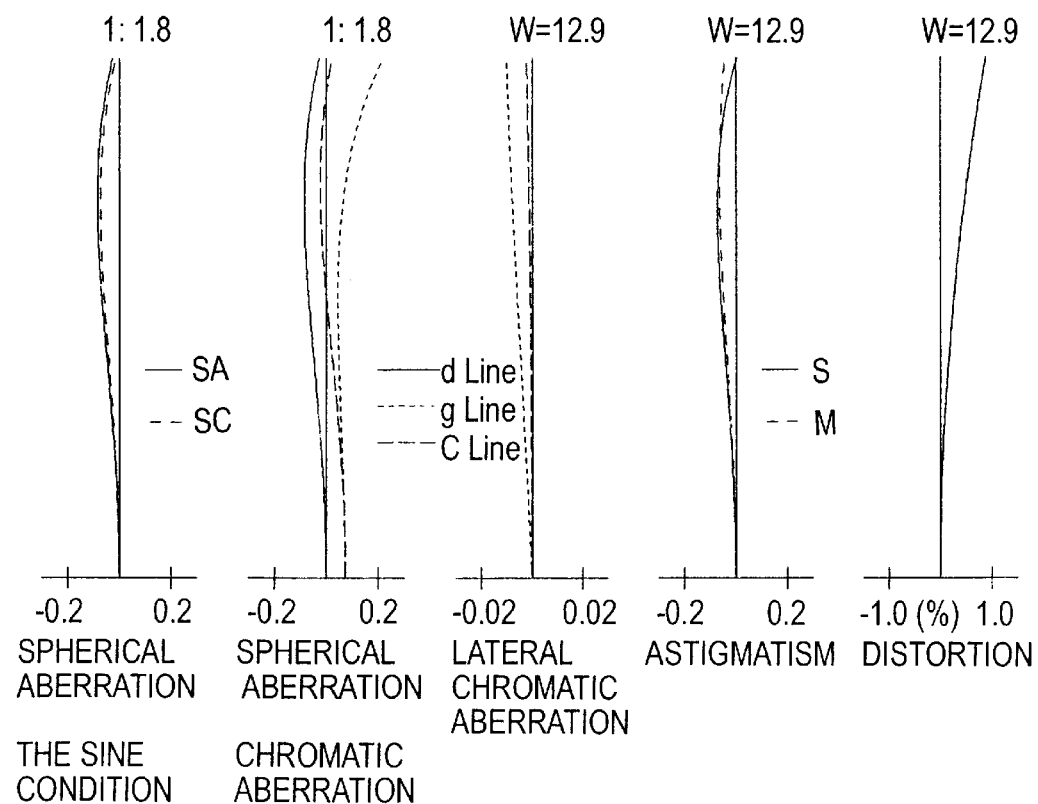
FIGS. 26A, 26B, 26C, 26D and 26E show aberrations occurred in the lens arrangement shown in FIG. 25.
Figure 27:
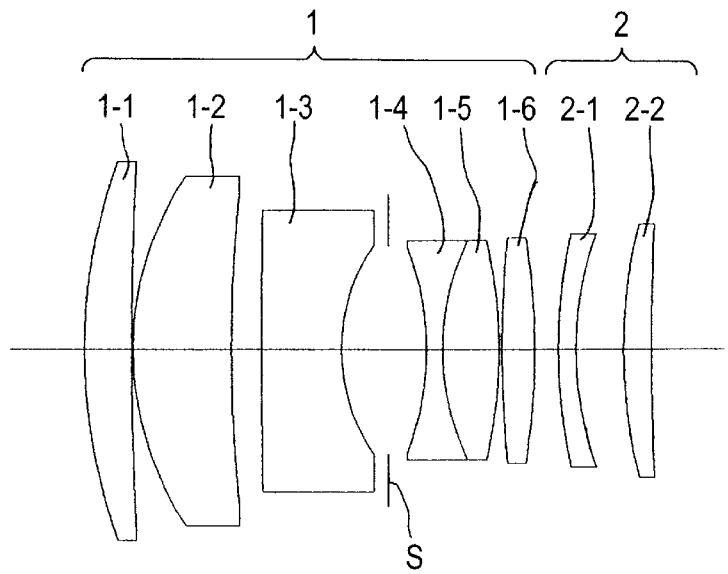
FIG. 27 shows the lens arrangement of the intermediate telephoto lens system according to the fifth embodiment, at a photographing magnification of –1/50.
Figures 28A, 28B, 28C, 28D, 28E:
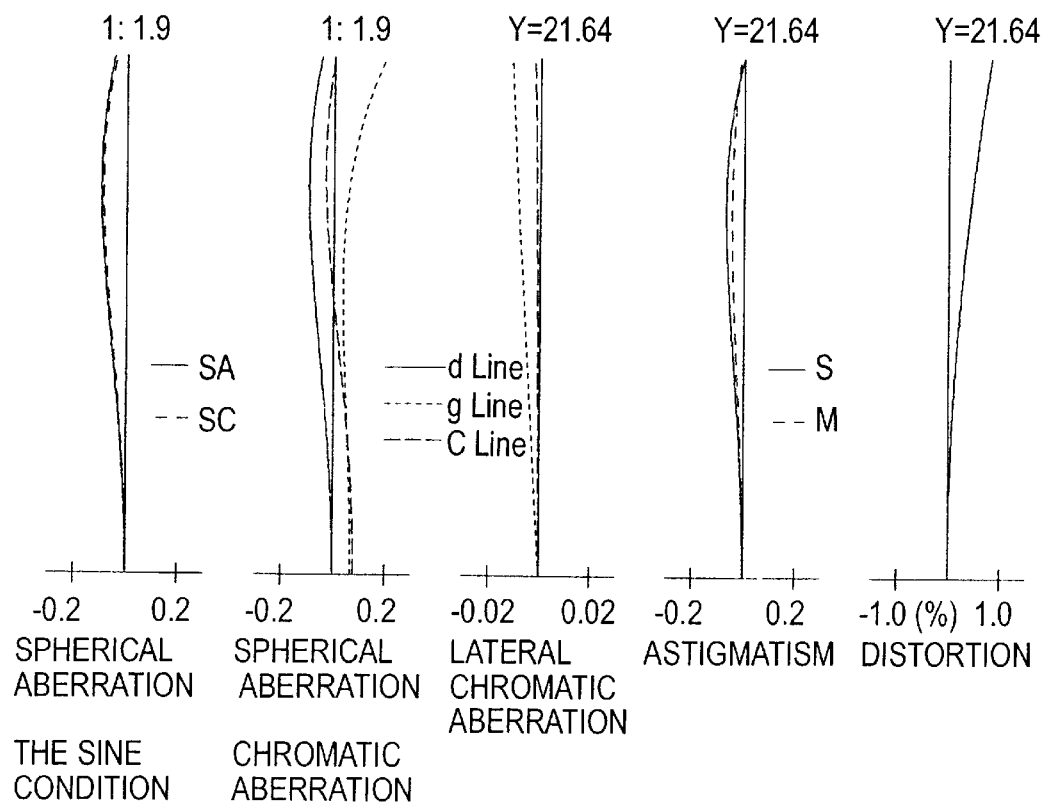
FIGS. 28A, 28B, 28C, 28D and 28E show aberrations occurred in the lens arrangement shown in FIG. 27.
Figure 29:
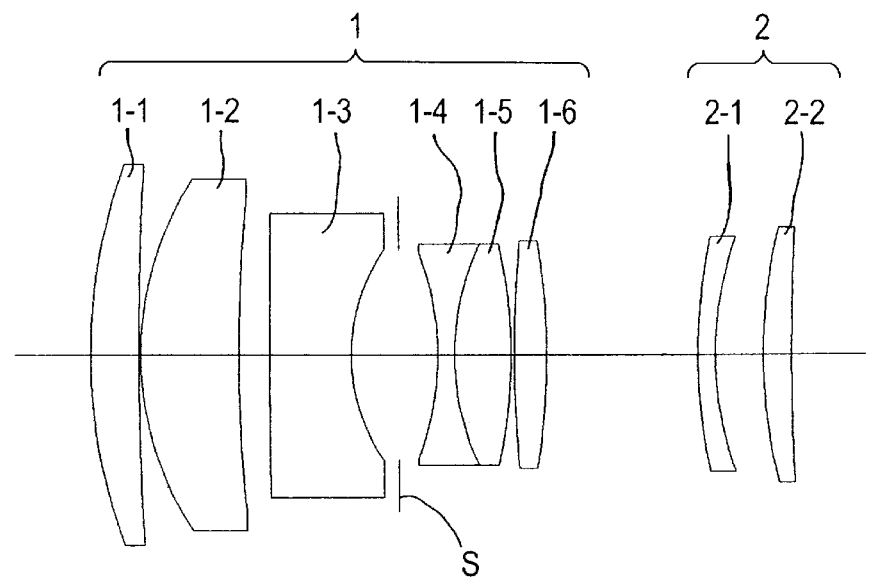
FIG. 29 shows the lens arrangement of the intermediate telephoto lens system according to the fifth embodiment, at the shortest photographing distance.
Figures 30A, 30B, 30C, 30D, 30E:
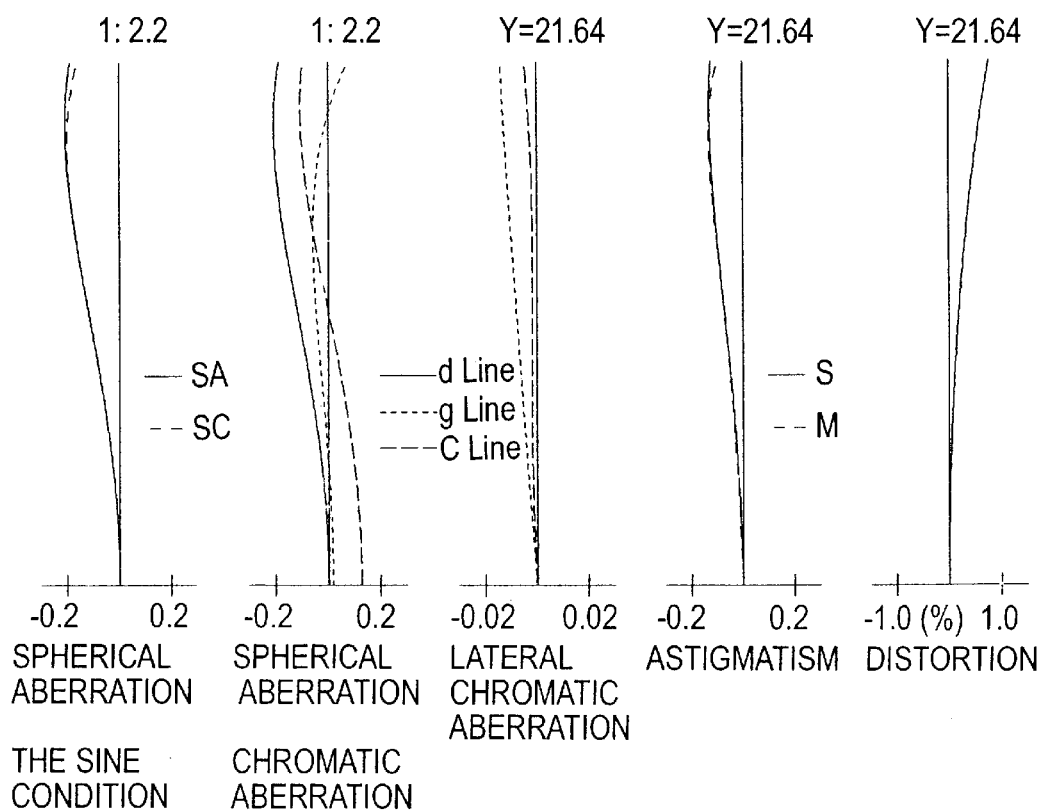
FIGS. 30A, 30B, 30C, 30D and 30E show aberrations occurred in the lens arrangement shown in FIG. 29.

FIG. 25 shows a lens arrangement of the intermediate telephoto lens system, when an object at an infinite photographing distance is in an in-focus state. FIG. 27 shows the lens arrangement of the intermediate telephoto lens system, at a photographing magnification of −1/50. FIG. 29 shows the lens arrangement of the intermediate telephoto lens system, at the shortest photographing distance. FIGS. 26A through 26D show aberrations occurred in the lens arrangement shown in FIG. 25. FIGS. 28A through 28D show aberrations occurred in the lens arrangement shown in FIG. 27. FIGS. 30A through 30D show aberrations occurred in the lens arrangement shown in FIG. 29. Table 5 shows the numerical data of the fifth embodiment. The basic lens arrangement of the fifth embodiment is the same as the first embodiment.

TABLE 5

|  | Infinity | −1/50 | Shortest-Photo-Distance |
|---|---|---|---|
| f = | 94.00 | | |
| $f_B$ = | 39.63 | 39.63 | 39.63 |
| m = | 0.000 | −0.020 | −0.192 |
| $F_{NO}$ = | 1:1.8 | | |
| W = | 12.9 | | |

| Surf. | r | d | $n_d$ | ν | $n_g$ | $n_F$ |
|---|---|---|---|---|---|---|
| 1 | 74.416 | 6.44 | 1.72916 | 54.7 | 1.74570 | 1.73844 |
| 2 | 462.635 | 0.20 | — | — | — | — |
| 3 | 43.202 | 13.21 | 1.61800 | 63.4 | 1.63009 | 1.62479 |
| 4 | 207.495 | 4.13 | — | — | — | — |
| 5 | 1306.596 | 10.99 | 1.71736 | 29.5 | — | — |
| 6 | 24.659 | 6.52 | — | — | — | — |
| Stop | ∞ | 5.21 | — | — | — | — |
| 7 | −38.253 | 2.20 | 1.56732 | 42.8 | — | — |
| 8 | 34.357 | 7.71 | 1.67790 | 55.3 | — | — |
| 9 | −65.960 | 0.42 | — | — | — | — |
| 10 | 152.370 | 4.46 | 1.80610 | 33.3 | — | — |
| 11 | −98.173 | 1.20 −3.23 −20.62 | — | — | — | — |
| 12 | 71.770 | 2.40 | 1.66680 | 33.0 | — | — |
| 13 | 45.912 | 6.49 | — | — | — | — |
| 14 | 71.293 | 3.78 | 1.54814 | 45.8 | — | — |
| 15 | 356.017 | — | — | — | — | — |

Each condition of each embodiment is shown in Table 6.

TABLE 6

|  | Embod.1 | Embod.2 | Embod.3 | Embod.4 | Embod.5 |
|---|---|---|---|---|---|
| Cond.(1) | 113.9 | 126.4 | 107.2 | 113.7 | 108.5 |
| Cond.(2) | −0.539 | −0.189 | −0.926 | −0.681 | −0.474 |
| Cond.(3) | −0.043 | −0.007 | −0.194 | −0.263 | −0.228 |
| Cond.(4) | 0.348 | 0.358 | 0.397 | 0.344 | 0.325 |

TABLE 6-continued

|  | Embod.1 | Embod.2 | Embod.3 | Embod.4 | Embod.5 |
|---|---|---|---|---|---|
| Cond.(5) | 0.272 | 0.353 | 0.250 | 0.235 | 0.295 |
| Cond.(6) | −4.046 | −13.026 | −1.883 | −2.676 | −4.551 |

According to the above description, an intermediate telephoto lens system which has at least the following features can be obtained: (i) chromatic aberration is made less noticeable; (ii) astigmatic difference and field curvature are small; (iii) the amount of change in aberrations occurred at infinity toward a close distance corresponding to a magnification of −1/5 is small; and (iv) an angle-of-view is about 24° to 27°.

What is claimed is:

1. An intermediate telephoto lens system comprising a positive first lens group, and a positive second lens group, in this order from an object;
   wherein said first lens group comprises a positive first lens element having stronger positive power on the object-side surface thereof, a positive second lens element comprising a positive meniscus lens element having positive power on the object-side surface thereof, a negative third lens element comprising a negative meniscus lens element having the concave surface facing toward an image, an aperture stop, cemented lens elements comprising a negative fourth lens element having a concave surface facing toward said object and a positive fifth lens element, and a positive sixth lens element, in this order from said object;
   wherein said second lens group comprises a negative seventh lens element comprising a negative meniscus lens element having the convex surface facing toward said object, and a positive eighth lens element, in this order from said object;
   wherein upon focusing, only said first lens group moves along the optical axis; and
   wherein said intermediate telephoto lens system satisfies the following condition:

$(v'_{1-1}+v'_{1-2})/2>102$ wherein
   $v'_{1-1}$ designates the dispersion ratio of said positive first lens element;
   $v'_{1-2}$ designates the dispersion ratio of said positive second lens element;

$(v'=(n_d-1)/(n_g-n_F))$ $n_d$ designates the refractive index of the d-line with respect to each lens element;
   $n_g$ designates the refractive index of the g-line with respect to each lens element; and
   $n_F$ designates the refractive index of the F-line with respect to each lens element.

2. The intermediate telephoto lens system according to claim 1, satisfying the following condition:

$-1.10<f/f_{2-1}<-0.05$ wherein
   $f_{2-1}$ designates the focal length of said negative seventh lens element.

3. The intermediate telephoto lens system according to claim 1, satisfying the following condition:

$-0.3<(\phi_4+\phi_5)f<0$ wherein
   $\phi_4$ designates the power of the image-side surface of said positive second lens element, which is defined as $\phi_4=(1-n_{1-2})/r_4$;
   $n_{1-2}$ designates the refractive index of said positive second lens element with respect to the d-line;
   $r_4$ designates the radius of curvature of the image-side surface of said positive second lens element;
   $\phi_5$ designates the power of the object-side surface of said negative third lens element, which is defined as $\phi_5=(n_{1-3}-1)/r_5$;
   $n_{1-3}$ designates the refractive index of said negative third lens element with respect to the d-line; and
   $r_5$ designates the radius of curvature of the object-side surface of said negative third lens element.

4. The intermediate telephoto lens system according to claim 1, satisfying the following condition:

$0.2<f/f_{1-6}<0.4$ wherein
   $f_{1-6}$ designates the combined focal length of said positive first lens element to said negative third lens element.

5. The intermediate telephoto lens system according to claim 1, satisfying the following condition:

$0.15<(r_7-r_9)/f<0.45$ wherein
   $r_7$ designates the radius of curvature of the object-side surface of said negative fourth lens element; and
   $r_9$ designates the radius of curvature of the image-side surface of said positive fifth lens element.

6. The intermediate telephoto lens system according to claim 1, satisfying the following condition:

$-20<\sigma_{2-1}<-1$ wherein
   $\sigma_{2-1}$ designates the shape factor of said negative seventh lens element, which is defined as $\sigma_{2-1}=(r_{13}+r_{12})/(r_{13}-r_{12})$;
   $r_{12}$ designates the radius of curvature of the object-side surface of said negative seventh lens element; and
   $r_{13}$ designates the radius of curvature of the image-side surface of said negative seventh lens element.

* * * * *